United States Patent [19]
Osofsky et al.

[11] 3,996,672
[45] Dec. 14, 1976

[54] REAL-TIME SIMULATION OF A POINT SYSTEM AS VIEWED BY A MOVING OBSERVER

[75] Inventors: Raymond C. Osofsky, Santa Clara; David Raymond Marsh, Los Altos; Wei L. Chen, Cupertino, all of Calif.

[73] Assignee: The Singer Company, Binghamton, N.Y.

[22] Filed: Mar. 12, 1975

[21] Appl. No.: 557,710

[52] U.S. Cl. .............................. 35/10.2; 35/12 N; 178/DIG. 35
[51] Int. Cl.² ........................................ G06F 15/20
[58] Field of Search ............... 35/10.2, 12 K, 12 N, 35/12 P; 46/1 B; 178/DIG. 35; 444/1; 340/172.5

[56] References Cited
UNITED STATES PATENTS 3,580,978    5/1971    Ebeling .............................. 35/10.2

*Primary Examiner*—R. Stephen Dildine, Jr.
*Attorney, Agent, or Firm*—Paul Hentzel; James C. Kesterson

[57] ABSTRACT

A night visual aircraft system receives flight data from an aircraft simulator, and terrain data from the gaming area data base. A computer within the night visual system organizes this image data by frame in a buffer memory according to a particular format of addresses, sequences, and bit places. The following types of image data are uniquely positioned in the format:

A position vector (Vp), defining the changing position of the aircraft with respct to the terrain data origin.
Rotational matrix data defining the changing attitude of the aircraft with respect to the axes of the terrain coordinate system.
Initialization vectors (Vi), defining the position of certain landmark terrain lights (initial points) with respect to the position of the aircraft.
Delta data, defining the position of other lights with respect to the landmark lights.
String data, defining the spacing, color, intensity, and number of lights in a string of lights having equal spacing and intensity.
CIF data, defining the color, intensity, and defocus of individual lights.
Transfer data which is coded to identify the type of the subsequent data.

An image processor receives the formatted image data and translates delta data into a light source vector (Vls) defining the position relationship between each light source and the aircraft; rotates the Vls into channel vectors (Vc) according to the window orientation and the attitude (pitch, yaw and roll) of the aircraft; and projects each three-dimensional Vc into a two-dimension display vector (Vd). An image generator receives the Vd and other image data to provide analog inputs to a CRT device which provides a window display in the simulated aircraft.

37 Claims, 6 Drawing Figures

Fig_1

Fig_3

REAL-TIME SIMULATION OF A POINT SYSTEM AS VIEWED BY A MOVING OBSERVER

TABLE OF CONTENTS

| SECTION | TITLE |
|---|---|
| I | ABSTRACT OF DISCLOSURE |
| II | BACKGROUND OF THE INVENTION |
| III | SUMMARY OF THE INVENTION |
| IV | DESCRIPTION OF THE FIGURES |
| V | GENERAL DESCRIPTION OF NIGHT VISUAL FLIGHT SIMULATION SYSTEM 10 |
| VI | DETAILED DESCRIPTION OF INTERFACE CONTROLLER 46 AND THE DATA FORMAT |
| VII | DETAILED DESCRIPTION OF NV COMPUTER 12 |
| | IMAGE PROCESSOR 42 |
| VIII | TRANSLATION STAGE 60 |
| IX | ROTATION STAGE 62 |
| X | PROJECTION STAGE 64 |
| XI | INPUT/TRANSLATION CONTROL LOGIC 68 |
| XII | TRANSLATION CONTROL LOGIC 68 |
| XIII | ROTATION AND PROJECTION CONTROL LOGIC 70 |
| | IMAGE GENERATOR 44 |
| XIV | DEFLECTION STAGE 72 |
| XV | CONCLUSION |
| | CLAIMS |

SECTION II

Background of the Invention

This invention relates to real-time digital image generation of a gaming area as viewed from a maneuverable viewpoint, and more particularly to such image generation of point structure displayed as points of light.

Heretofore, digital image generation (DIG) has been used in architecture and mathematics to display three-dimensional objects. The viewer could maneuver the display to obtain different perspective views, helpful in building the objects or understanding the relationship between parts thereof. However, these systems were basically nondynamic and lacked the realism of real-time maneuvering.

DIG has been employed in real-time simulation applications with limited success. Insufficient object data and field-of-view data could be processed within a 1/60th of a second frame time to create a realistic scene. The resulting displays were simple and cartoonish in nature.

SECTION III

SUMMARY OF THE INVENTION

It is therefore an object of this invention to:

provide a real-time, realistic DIG display system which processes data rapidly and efficiently;

provide DIG display system which is simpler, less expensive, more compact and more reliable;

provide a DIG display system employing a data base of points which provide a display of point objects;

provide a DIG display system which may be expanded to provide a plurality of window displays having related fields of vision;

provide a DIG display system in which the image data is formatted to enhance data flow and/or minimize the deflection movement period required by the display;

provide a highly realistic night visual aircraft simulation system which simulates night flying conditions;

provide a DIG system in which all of the object data are processed each frame without preselection as a function of the orientation of the observer.

SECTION IV

Description of the Figures

Further objects and advantages of the present invention, and the operation of the night visual system, will become apparent from the following detailed description taken in conjunction with the drawings, in which.

SECTION V

General Description of Night Visual Flight Simulation System 10

Figure 1:
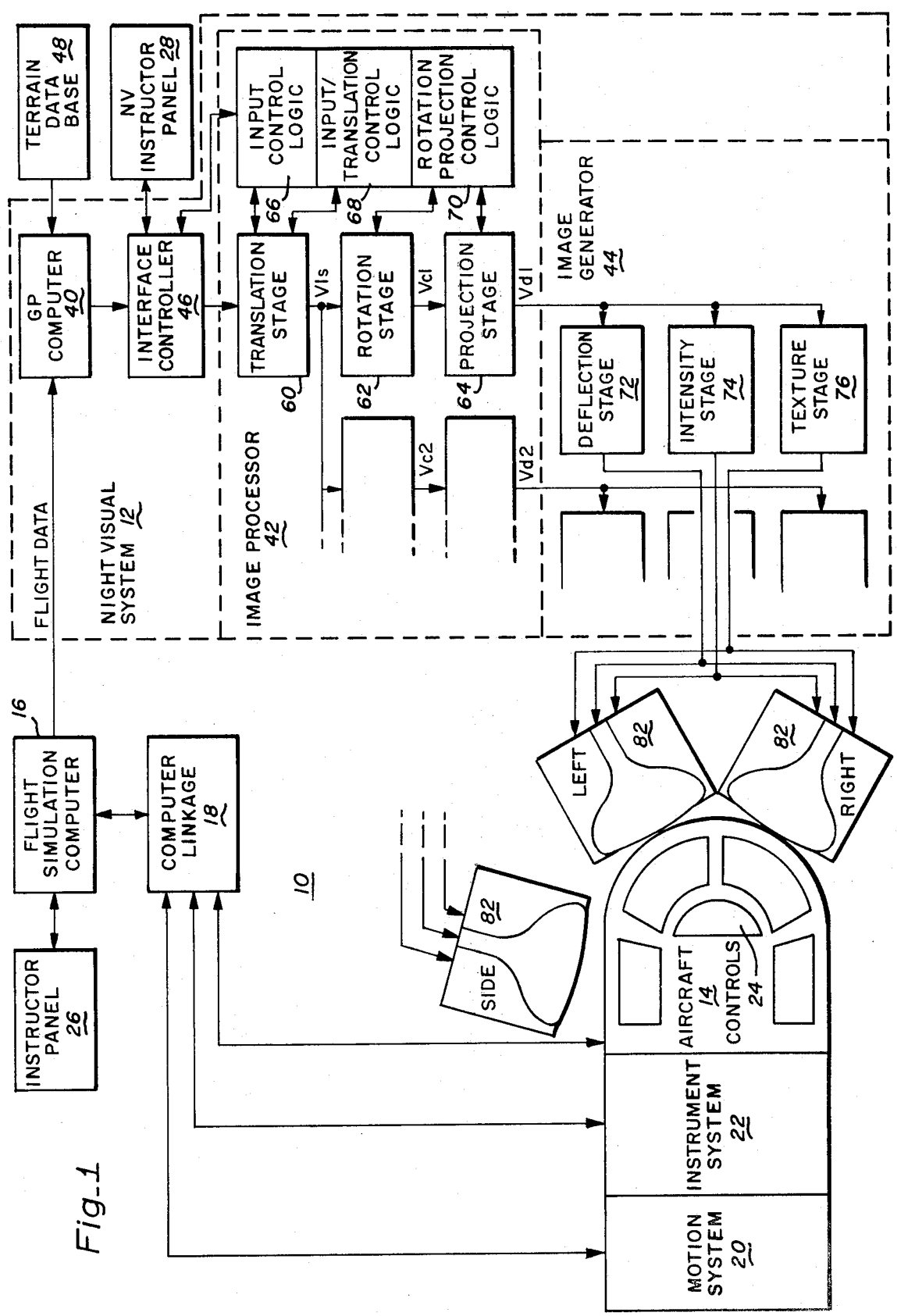
FIG. 1 is a block diagram of the night visual system and peripheral equipment showing data flow relationships.

FIG. 1 shows a flight simulation system 10 with night visual capabilities provided by a night visual (NV) system 12. A simulated aircraft 14 is linked to flight simulation computer 16 and NV system 12 through computer linkage 18. Flight computer 16 controls motion system 20 and instrument system 22 of aircraft 14 in response to the pilot's maneuvering action at aircraft controls 24. Additionally, instructors at instructor panel 26 and NV panel 28 may create useful training situations such as engine failure, disabled landing gear, etc. which affect the handling of aircraft 14. NV system 12 is formed by general purpose computer 40 such as Digital Equipment Corporation PDP 11/35, image processor 42, image generator 44, and interface controller 46. Interface controller 46 is provided to control image data flow from GP computer 40 to image processor 42 via a data buffer, to process instructor data from panel 28 to GP computer 40, and to process flight data from aircraft 14 to image processor 42.

GP computer 40 receives flight data, such as aircraft position, aircraft attitude (roll, pitch and yaw), etc. from computer 16. GP computer 40 additionally receives night-time earth data from data base 48 such as landing lights, light strings, environmental lights, beacons, etc., preferably including the intensity, color and size of each light source. Preferably, the aircraft position data is an aircraft position vector $Vp$ extending from the simulated position of aircraft 14 to the origin of the earth coordinate system. In order to simplify conception and data organization, the origin is preferably located proximate the touchdown area of the runway and X axis of data base 48 is coincident to the runway centerline. An updated $Vp$ is supplied each display frame by flight simulation computer 16 as the flight parameters of aircraft 14 change. GP computer 40 combines $Vp$ and the position of certain key light sources (i.e. the first light in each string) from data base 48 for providing a series of initialization vectors Vi to image processor 42. The earth data also includes the relative position of other light sources (delta data) including the rest of the light string (string data). Translator stage 60 in image processor 42 combines the delta data with the appropriate Vi to provide a light source vector Vls for each remaining light source. Rotation stages 62 rotate each Vls by combining it with aircraft attitude data (a 3×3 rotation matrix). A different rotation is required for each channel or viewing axis from aircraft 14. Rotation stages 62 provide channel vectors Vc to projection stages 64 which project the three-dimensional Vc into two-dimensional display coordinates or vectors Vd. The data flowthrough image processor 42 and the mode of operation is controlled by input control logic 66, translation control logic 68 and rotation-projection control logic 70.

Deflection stage 72 within image generator 44 receives the positional portion of the processed image data from image processor 42 and provides analog deflection voltages to CRT display devices 82. Intensity stage 74 receives the color, intrinsic intensity and size portion of the data for controlling the CRT beam voltage, current and focus, and is described in more detail in U.S. patent application Ser. No. 557,543 entitled "Real-Time Simulation of a Point System Having Intensity Attenuation as Viewed by a Moving Observer" filed herewith by Wei L. Chen and R. G. Nielsen, and assigned to the present assignee. The CRT in device 82 is preferably a beam penetration, random deflection tube which allows precise control of spot position, continuous control of spot focus and diameter, and provides at least two phosphors of different colors. Texture stage 76 receives texture portion of the data for controlling the painting by electron beam scanning within display devices 82 and is described in more detail in U.S. patent application Ser. No. 557,543 entitled "Real-Time Simulation of a Point System Having Textured Areas as Viewed by a Moving Observer" filed herewith by Robert L. Peters and assigned to the present assignee.

SECTION VI

Detailed Description of Interface Controller 46 and the Data Format

GP computer 40 has an in-core, buffer memory which contains all the image data required by the current frame. In the present example the in-core buffer is 16 bit by 1024 boards and contains all of the light points in data base 48. Software clipping may be employed for narrowing the software field of view and eliminating points not visible to the pilot due to aircraft orientation. In the present example, logic clipping is employed in projection stage 64. Image data is identified by code bits and by location in the buffer format. Fixed data such as Vi, delta data, string data, most CIF data, is entered into the proper address and bit place within the core buffer immediately from data base 48. Flight data (Vp and rotation matrix) is entered from flight simulation computer 16. Time-dependent data such as revolving bicolor airport beacons, hazard beacons, blinking obstruction lights, landing approach strobe, fog and cloud effects, are calculated by computer 40 and entered into the in-core buffer. Other special training effects such as ground traffic, other airborne traffic, air-to-air refueling, mobile emergency equipment, or simulation of an aircraft carrier landing site may be programmed in via GP computer 40 or manually entered through instructor panels 26 and 28.

When the in-core buffer is completed, the entire contents are transferred to a 16 × 1024 storage medium such as a hardware RAM buffer 204 in interface controller 46. Controller 46 processes the 1024 16-bit words sequentially to image processor 42 and GP computer 40 simultaneously assembles an in-core buffer of the next frame. RAM buffer 204 may be formed by 16 1 bit by 1024 bits random access memory (93415 Fairchild).

Initialization of each initial point requires four words for each dimension X, Y and Z, a first transfer code word, a 16 bit data word, and second transfer code word and an 8 bit data word. Twelve words are required to process an initial to 24 bits of resolution (23 data bits plus a sign bit). The LSB is ¾ of an inch to eliminate detectable jumping of the scene from frame to frame. A new Vp is calculated by FS computer 16 each frame and the round-off error in the LSB of Vp causes the entire earth coordinate system to jump a ground distance equal to the LSB. This interframe displacement is minimized and rendered undetectable to the pilot by providing initial point resolution to the ¾ inch level. The MSB of initialization data is 524288 feet. The gaming area of data base 48 is a cubic volume +524288 feet on an edge.

A single word of CIF data is processed to establish the light source characteristics of the first point, and then delta data is processed point by point. Delta data for each set of noninitial points is formatted in RAM buffer 204 to minimize data changes between points. Many lights in a set have common CIF data (color, intrinsic intensity). These delta light points may be processed sequentially without a CIF updating word. A string of horizontal lights parallel to the X axis of identical color and intensity may be processed by a single word of delta data for each light to define the change in position along the X axis (delta Y being zero). In, in addition, the lights are equally spaced along the X axis, then the entire string of lights may be processed by a single word of string data defining the number of lights in the string. The image data may be formatted in this manner to minimize data processing time. Further, optimum formatting will minimize the cumulative ballastic response time required for each frame. That is, sequential points are adjacent rather than remote to minimize electron beam traversing time; and lights of the same color, intensity and size are processed together because of the time required to change the penetration, current and focus of the electron beam.

Each 16 bit word in the RAM buffer has three code bits followed by 13 data bits. The code bits control the next operation of image processor 42. The data bits contain X, Y or Z initialization data, delta data, transfer data, scale color and intensity data, or the number of lights in a string. There are two exceptions to the three MSB code format: (1) Each data word containing a transfer code is followed by a 16 bit data word (no code bits) and (2) nine rotational matrix components are transfered in a block.

The following is a list of code descriptions for bits 15–13 and the data content for bits 12–0 for the data format in RAM buffer 204 of controller 46.

INX (Increment X)

```
| 0 0 0 |    Δ X    |
 15    13 12        0
```

The code (000) causes the X increment (delta X) to be loaded into the delta X register 210 of translation stage 60.

IXC (Increment X and Compute)

```
| 0 0 1 |    ΔX    |
 15    13 12       0
```

The code (001) causes the X increment (delta X) to be loaded into the delta X register 210 and also starts the operation of translation stage 60.

INY (Increment Y)

```
| 0 1 0 |    ΔY    |
 15    13 12       0
```

Similar to INX.

IYC (Increment Y and Compute)

```
| 0 1 1 |    ΔY    |
 15    13 12       0
```

Similar to IXC.

INZ (Increment Z)

```
| 1 0 0 |    ΔZ    |
 15    13 12       0
```

Similar to INX. An IZC can be provided with a larger code base. However, in a night visual airport application, vertically stacked lights (delta X = delta Y = 0) are unusual.

STG (String)

```
| 1 0 1 |⊠| No. of lights |
 15    13              7  0
```

Defines the number of lights in a string of uniformly spaced lights of the same color and intrinsix intensity. The spacing between lights in a string is defined by the delta X, delta Y, and delta Z codes immediately following the STG code.

CIF (Color, Intensity Code, Flags)

```
| 1 1 0 |  f  | c- | c+ | i |
 15    13    9 8  6 5  3 2  0
```

Defines the color ($c$) and intrinsic intensity ($i$) of the light source.

$c$ = color codes, positive and negative relative position for bidirectional light sources which are disclosed in more detail in U.S. patent application Ser. No. 557,714 entitled, "Real-Time Simulation of a Point System Having Multidirectional Points as Viewed by a Moving Observer" filed herewith by David R. Marsh and Raymond C. Osofsky, and assigned to the present assignee.

$i$ = intensity code
$f$ = options control code $i$ = intensity code
$f$ = options control code

XFR (Transfer)

```
                  ┌─Initialization Flag
                  │ ┌─Channel Flag
                  ↓ ↓
| 1 1 1 | i | c | cn | d |⊠|
 15    13 12 11 10  8 7  5 0
```

Code (111) transfers the next data word to the window or channel specified by $cn$ (three bits) and the data register specified by the data address field, $d$ (three bits). The word following a transfer code is an initialization data without any code bits.

$cn$ = The window channel to which the data is being directed.

$d$ = Destination of data transfer. The source is the data word immediately following the XFR. $i$ = Initialization Flag. A 1-bit in this bit position indicates a data transfer for initialization, as shown in the following table.

$c$ = Channel flag. A 1-bit in this bit position indicates that the data transfer is channel-dependent, thus requiring channel select specification in $cn$.

TABLE OF XFR CODES*

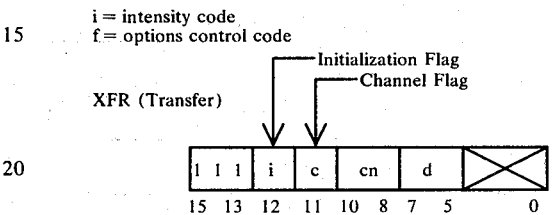

Initial Value

X, 8 LSB

X, 15 MSB + sign

Y, 8 LSB

Y, 15 MSB + sign

Z, 8 LSB

Z, 15 MSB + sign

Rotation matrix to designated channel, in order of:

h(21), h(22), h(23)
h(11), h(12), h(13)
h(31), h(32), h(33)

TABLE OF XFR CODES*-continued

Data to designated
channel and register

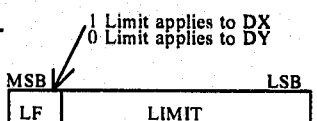

*Blank fields are not decoded; 111 in bit positions
13 to 15 are common to all XFR codes.

DATA REGISTER FORMAT:

Register Address
(Xfer Sequence)

0

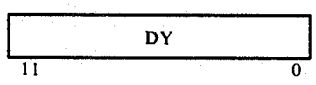

1

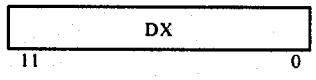

2

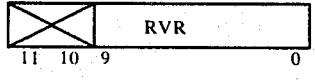

3

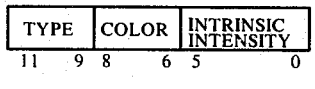

4

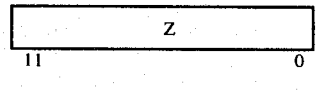

5

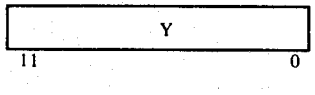

6

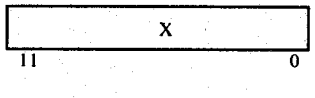

7

| | | | | | | | | | | |
|---|---|---|---|---|---|---|---|---|---|---|
| 8 Taper Slope | S | 8 | 7 | 6 | 5 | 4 | 3 | 2 | 1 | 0 | T |
| 9 Taper Constant | S | 8 | 7 | 6 | 5 | 4 | 3 | 2 | 1 | 0 | F₁ F₂ |
| 10 Ramp Oscillator | | 9 | 8 | 7 | 6 | 5 | 4 | 3 | 2 | 1 | 0 S |
| 11 Intensity Oscillator | | 9 | 8 | 7 | 6 | 5 | 4 | 3 | 2 | 1 | 0 G |
| 12 Intensity Bias | S | 8 | 7 | 6 | 5 | 4 | 3 | 2 | 1 | 0 | |
| 13 Taper Bias | S | 8 | 7 | 6 | 5 | 4 | 3 | 2 | 1 | 0 | |

EOM

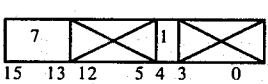

End of Mode:
Used to empty the image processor pipeline. The EOM code must follow
immediately an IXC or IYC code. The EOM code is used to terminate the
light point mode and to start the vector write mode.

SECTION VII

Detailed Description of NV Computer 12

Each stage of NV computer 12 is shown in detail in FIGS. 2 through 6. Preferred embodiments are disclosed at the detailed logic level. Each component is described by function, input-output characters, or conditional nomenclature to enable one skilled in the arts simulation, digital design, and computer programming to practice the invention. The components are additionally designated by the manufacturer's IC type number from the following integrated circuits data books:

Texas Instruments Incorporated
  "The TTL Data Book for Design Engineers"
  First Edition, Copyright 1973
National Semiconductor Corporation
  "Digital Integrated Circuits"
  January 1974
Advanced Micro Devices Inc.
  "Advanced Micro Devices Data Book"
  Copyright 1974 unless otherwise specified. Further, many inverters are employed throughout NV system 10 for buffering signals with multiple loads. These buffer inverters are type 74S04 unless otherwise stated.

SECTION VIII

Translation Stage 60

Figure 2:
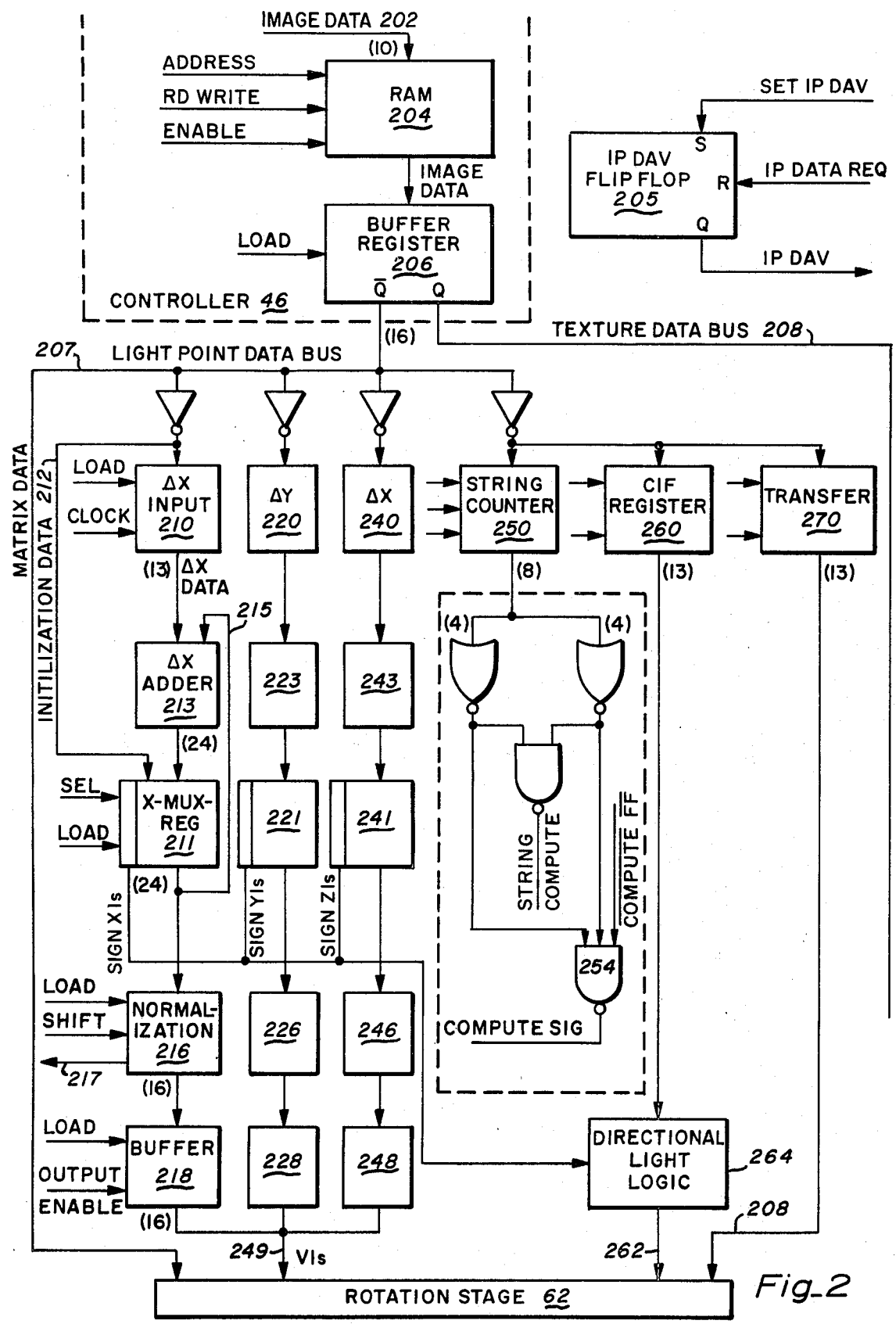
FIG. 2 is a logic circuit of the translation stage wherein delta data ($\Delta X$, $\Delta Y$, $\Delta Z$) is translated into light source vectors ($Vls$)

FIG. 2 shows translation stage 60 of image processor 42 and a portion of controller 46. Controller 46 receives image data in sequential order from computer 40 at an input 202 of a random access memory 204. The image data is arranged by frame in data blocks M bits wide and N words long. In this embodiment frame block is 16 bits X, a multiple of 1024 words, and generates about 2000 light points making up the scene content of a single 1/30 second frame of CRT device 82. RAM 204 handshakes with a core memory in GP computer 40 to reproduce each frame of data. Image data is sequentially transfered from RAM 204 through a buffer register 206 to a light point data bus 207 and a texture data bus 208 in response to load pulses from interface controller 46.

RAM 204 may be formed by 16 1024 bit RAMS (93415 Fairchild) connected in parallel for holding the frame data. Register 206 may be formed by four 4 bit registers (74S175).

Frame data is coded as described in section II to enable one of six input registers 210, 220, 240, 250, 260 or 270 connected to light source data bus 207. X coordinate data for light sources in data base 48 is coded either INX(000) or IXC(010) and is loaded into a delta X input register 210 in response to load pulses from input control logic 66, preferably in concert with clock signals from a sync clock gate. Initialization vector data (Vi) follows a code XFR (111) and loads into X-Mux/Reg 211 on select from translation control logic 68. Initialization vectors load through bypass lead 212 to avoid delta X adder 213.

Initialization vectors position land mark points in data base 48 such as the beginning of light strings. After X-Mux 211 has been initialized, the delta X data of subsequent points in the string is loaded into input register 210 and passes through X adder 213 where each delta X is added to the X coordinate of the previous light point in the string generating the X$ls$ portion of the vector V$ls$ (X$ls$, Y$ls$, Z$ls$) for each light source. Mux register 211 holds these previous coordinates and cycles them back to adder 213 on lead 215 for updating.

A normalization register 216 loads the updated X coordinate data, and left shifts leading zeros or ones for negative numbers in response to translation control logic 68. The first difference between most- and second-most-significant bit in normalization register 216 generates a normalization complete signal back to translation control logic 68 on lead 217. Normalization complete in any of the X, Y or Z normalization registers 216, 226 or 246 stops the normalization process of all the registers insuring that the normalized points maintain consistent dimension units and remain on the same line of vision as viewed on display 82. Normalization has the advantage of reducing the 24 bit initialization data into 16 bits of normalized data by eliminating either leading zeros or ones for negative numbers. The data load is reduced to 66% with negligible loss in position resolution. Logic control 68 then loads the normalized data into an output buffer register 218 which temporarily holds the data while X data for the next light point is accumulated.

Input register 210 may be formed by two 6 bit buffer registers (74S174) and one 4 bit buffer register (74S175) for accommodating the 13 remaining data bits. The three MSB of the 16 bit input on bus 207 was consumed by input code. These three bit places are now used in register 210 to propagate the sign bit to fill the 24 bit places of adder 213 input. Delta X data is a short distance for which 13 bits have been allotted, while initialization data is generally a greater distance and has been allotted 24 bits. Adder 213 may be formed by six 4 bit binary full adder (74283). X-Mux 211 may be formed by six quadruple 2 input multiplexer with storage (74298). Normalization register 216 may be formed by three 8 bit shift registers (74199). Buffer 218 may be formed by four TRI STATE quad D flip-flops (DM 8551 National).

Y coordinate data is coded INY(010) or IYC(011) for loading into delta Y input register 220. Y data is processed through delta Y adder 233 and Y-Mux 221 as described above with respect to X. Y data is left shifted in normalizer 226 and loaded into Y buffer 228. Z coordinate data is coded INZ(100) and is processed through the corresponding components 240, 243, 241, 246 and loads into Z output buffer 248. Preferably, both Y and Z components are constructed and operate identically to the X components to provide the Y$ls$ and Z$ls$ components of V$ls$.

Output buffers 218, 228 and 248 operate in a TRI STATE configuration to output light source vectors (V$ls$) on lead 249 to rotation stage 62 in response to an output enable signal from translation logic control 68. Only one output buffer may be enabled at one time which prevents mixing of X, Y and Z data.

Data on bus 207 concerning the number of light points in a string is coded STG(101) and through input logic control 66 enables a string counter 250 to load. The string data is held in counter 250 until a count pulse is received from logic control 68. Counter 250 then counts down through a zero detect circuit 252 providing a string complete signal back to translation logic control 68. Counter 250 may be formed by two down counters (74193). Zero detect 252 may be formed by two NOR gates (7425) and one NAND gate (74S00) as shown.

Data on bus 207 concerning color, intensity and flags is coded CIF(110) and through logic control 66 enables a CIF register 260 to load the CIF data. Register 260 holds the CIF data while coordinate data is processed on line 262 through translation stage 60 and rotation stage 62. Register 260 then loads into another CIF register (460 in FIG. 4) which holds the CIF data while coordinate data is processed through projection stage 64. The CIF data is then forwarded to image generator 44. CIF register 260 may be formed by two 6 bit registers (74S174) and one 1 bit flip-flop (74S74).

The 13 bits following code XFR(111) are additional code bits for identifying initialization vectors, rotation data, and texture data which are contained in the subsequent words. The XFR additional code is loaded into a transfer register 270 and processed into input control logic 66 to control the flow of light point data on subsequent word. Register 270 may be formed by two 6-bit registers (74S174) and one 1-bit flip-flop (74S74).

Texture data on bus 208 specifies painted (or greater-than-light-source-size) areas which are colored by electron beam scanning in the CRT displays.

The channel flag bit (XFR code 111, bit 11) indicates the window or viewing axis of the data. Each view axis or perspective requires a separate rotation stage 62, projection stage 64, image generator 44. However, the two front windows of aircraft 14 have very similar perspectives and may share a common channel which inputs to both devices 82 left and 82 right. Device 82, if implemented, requires a separate channel which is identified by the flag bits.

SECTION IX

Rotation Stage 62

Figure 3:
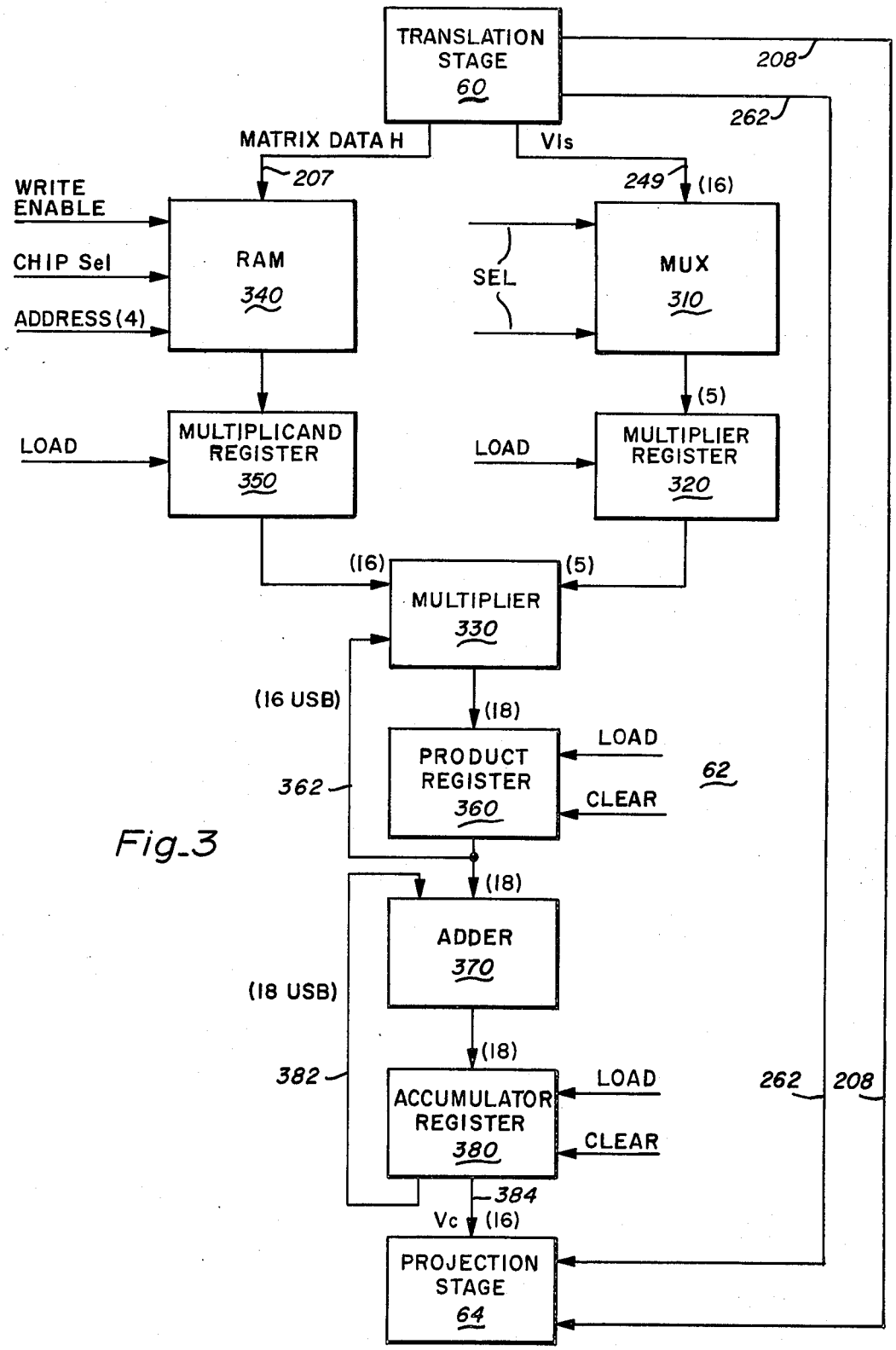
FIG. 3 is a logic circuit of the rotation stage wherein the $Vls$ is multiplied by a rotation matrix in response to the aircraft attitude to provide channel vectors ($Vc$)

FIG. 3 shows rotation stage 62 of image processor 42 which multiplies the V$ls$ at input 249 by a rotation matrix H provided on data bus 207 to produce the rotated vector or channel vector Vc(XcYcZc):

$$\begin{matrix} Xc \\ Yc \\ Zc \end{matrix} = [H] \begin{matrix} Xls \\ Yls \\ Zls \end{matrix}$$

The rotation matrix H is developed from yaw ($\psi$, left), pitch ($\theta$, down) and roll ($\phi$, right) motions. Assuming that the order of rotation is $\psi$ followed by $\theta$ followed by $\phi$, the matrices for the separate rotations from translated to rotated pilot eye or channel coordinates are as follows:

$$H\psi = \begin{bmatrix} \cos\psi & \sin\psi & 0 \\ -\sin\psi & \cos\psi & 0 \\ 0 & 0 & 1 \end{bmatrix}$$

$$H\theta = \begin{bmatrix} \cos\theta & 0 & -\sin\theta \\ 0 & 1 & 0 \\ \sin\theta & 0 & \cos\theta \end{bmatrix}$$

$$H\phi = \begin{bmatrix} 1 & 0 & 0 \\ 0 & \cos\phi & \sin\phi \\ 0 & -\sin\phi & \cos\phi \end{bmatrix}$$

The composite matrix H describing this rotation is given by the matrix product
$$[H] = [H\phi][H\theta][H\psi]$$
The aircraft attitude matrix H is constant for each frame and is therefore computed only once per frame for each channel.

A multiplier multiplexer 310 receives 16 bit X$ls$, Y$ls$ or Z$ls$ data on lead 249 and sequentially outputs the data in four 4 bit parts (plus one carry place) to a multiplier register 320 in response to select signals from control logic 70. Register 320 receives the multiplexed 5 bit data in response to load signals from control logic 70, and simultaneously outputs to a flow-through multiplier array 330. The nine elements of rotation matrix data (H) from bus 207 load into a 16 word X 16 bit/word RAM 340 in response to control logic 68. As required during the rotation calculation, control logic 70 addresses RAM 340 and loads particular elements into a multiplicand register 350 which simultaneously outputs to array 330. Array 330 is a 16 bit by 4 bit multiplier and outputs to a product register 360 the product of a given matrix element times one of the 5 bit parts from register 320. Feedback line 362 causes the 16 MSB of these partial products to be combined to form the product of one element-coordinate product to product register 360. Four multiplication cycles are required for each position input data from 249. Accumulator register 380 holds the first element-coordinate product (18 bits) and adds the remaining two through adder 370 on feedback line 382 (18 MSB) as the remaining products become available from product register 360. Three cycles of accumulator 380 are required to form a single rotated coordinate coefficient (16 bits) at rotation stage output 384.

Multiplier MUX 310 may be three dual 4-1 MUX (75S153) connection parallel with one 4 bit input surplus. Multiplier register 320 may be one 6 bit register (74S174). Multiplier array 330 is eight flow-through multipliers (AM25505 Advanced Micro Devices) in 16 bit X 4 bit configuration. RAM 340 may be four 16 word memories (74S189) with 5 words surplus. Multiplicand register 350 may be two 6-bit registers (74S174) and one 4-bit register (74S175) connected in parallel. Product register 360 may be three 6-bit registers (74S174) connected in parallel. Adder 370 may be four 4-bit binary full adders (74283). Accumulation register 380 may be three 6-bit registers (74S174).

SECTION X

Projection Stage 64

Figure 4:
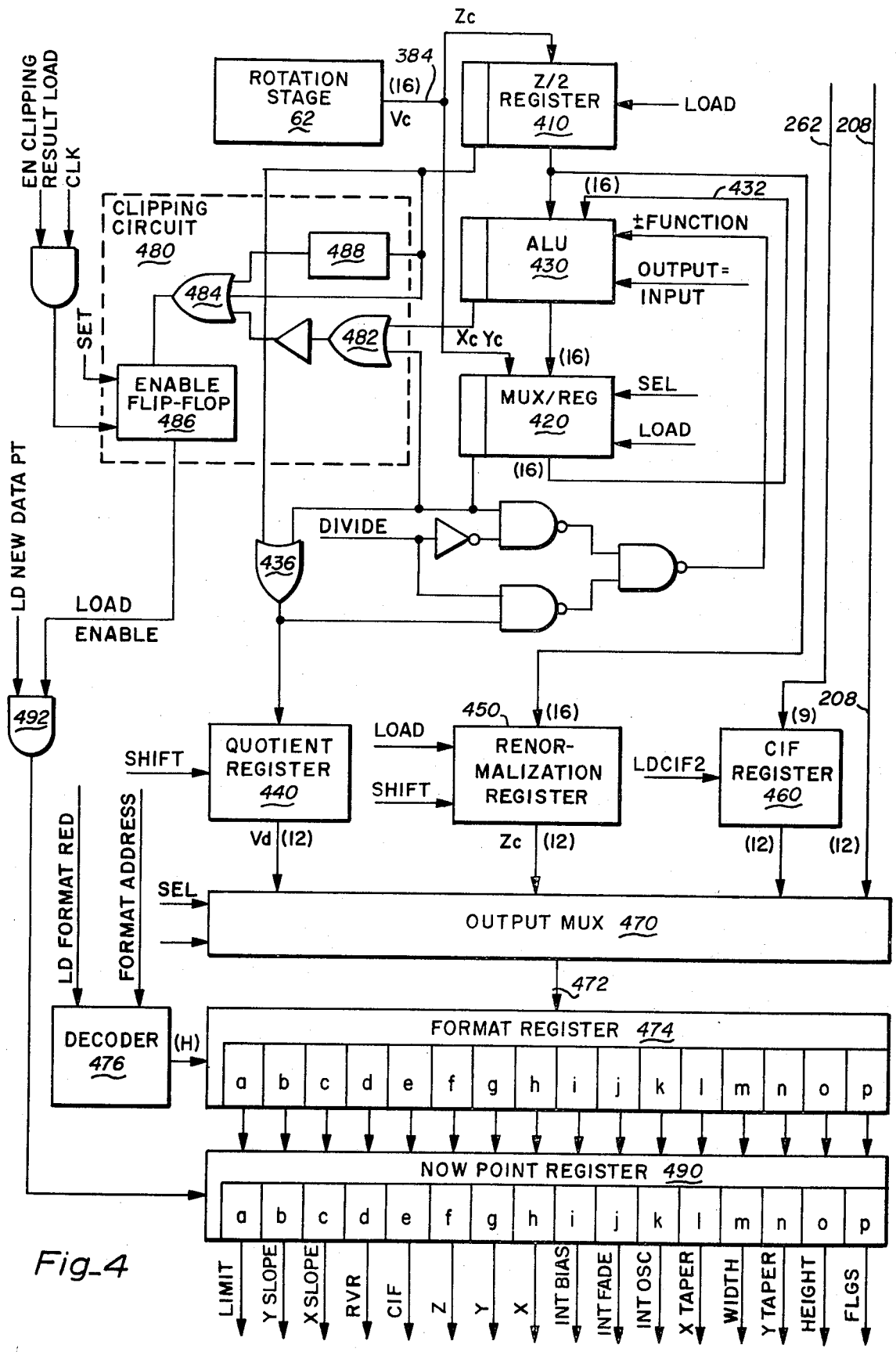
FIG. 4 is a logic circuit of the projection stage wherein $Xc$ and $Yc$ are divided by $Zc$ to project $Vc$ into the X–Y plane to form deflection vector ($Vd$)

FIG. 4 shows projection and clipping stage 64 of image processor 42 which projects three-dimensional vectors $Vc$ ($Xc$ $Yc$ $Zc$) from stage 62 into a two-dimensional deflection vector $Vd$ containing deflection data $Xd$ and $Yd$ used by image generator 44 for positioning the electron beam in CRT displays. This projection is accomplished by dividing $Xc$ and $Yc$ by $Zc$ through the binary division nonrestoring technique (described in "Digital Arithmetic — I" By Y. Chu, pages 39–43). Z/2 register 410 loads the divisor $Zc/2$ and Mux/Register 420 selects and loads the dividend $Xc/2$ or $Yc/2$ in response to control logic 70. The inputs to registers 410 and 420 are right-shifted by one digit to divide the $Vc$ data on line 394 by two. Arithmetic logic unit ALU 430 then receives the dividend through a shift return loop 432 and adds or subtracts $Zc/2$ thereto in response to a ± function from logic 70. The dividend ± $Zc/2$ term is loaded into Mux 420, returned to ALU 430, and then combined with another ± Z/2. The 16 bit output of ALU 430 is slew wired with respect to the 17 bit input to Mux 420 causing a division by two right shift. The binary division by $Zc$ requires 12 cycles for each X projection and each Y projection. The $Xc/Zc$ and $Yc/Zc$ quotients are generated one bit at a time, MSB first, by comparing the sign bit (MSB) of $Zc$ with the sign bit of the partial remainder with Mux 420 through sign gate 436. The quotient bits individually enter quotient register 440 and are left-shifted by control logic 70. $Zc$ is loaded into renormalization register 450 and is right-shifted by control logic 68 the same number of places as were left-shifted in normalization 246 in translation stage 60. Color, intensity, and flag data on line 262 is loaded into CIF register 460 in response to control logic 68.

The contents of registers 440, 450 and 460 plus texture data on line 208 pass through multiplexer 470 and appear on output 472 in response to select signals from control logic 70. Data on line 472 is serially loaded into format registers 474$a$–$p$ by decoder 476 in response to LOAD FORMAT REGISTER and FORMAT ADDRESS from control logic 68. Output 472 may interface with a remotely positioned image generator 44, preferably through suitable line driver devices such as DM8830s. Clipping circuit 480 compares the sign bits of $Zc/2$, ($Xc$ or $Yc$)/2, and the contents of ALU 430 to determine if the light point being processed is within the field of view of the associated window or channel. The field of view may be logic clipped to any desired size; however, a square field of vision (53.14 by 53.14°) along the X and Y dimension is preferred because the arc cotangent of 26.57° is two. Thus, if ($Xc$ or $Yc$)/$Zc$ is less than two as determined by gate 482 and 484, the light point is within the logic field of view and enable flip-flop 486 provides a Load Enable signal to new point register 490 through new point gate 492 which, in junction with LOAD NEW DATA POINT from control 70, forwards the content of register 490 to image generator 44.

Gate 482 compares the sign bit of ($Xc$ or $Yc$)/2 initially in register 420 to the sign bit of (/$Xc$/ or /$Yc$/) + $Zc/2$ initially in register 420 to the sign bit of (/$Xc$/ or /$Yc$/) + $Zc/2$ initially in register 430 to determine if ($Xc$ or $Yc$) is greater or less than $-Zc/2$. All points having $Xc$ or $Yc$ data greater than $-Zc/2$ are outside the field of view and are not forwarded to image generator 44. The output of gate 482 is inverted and compared with the sign of $Zc/2$ by gate 484 to inhibit all $-Zc$ data. Gate 484 also inhibits all data within a given distance from aircraft 14 through one detector 488 which monitors the ten MSBs of $Zc$ to inhibit all data with a $Zc$ value of five places or less.

Z register 410 may be three 6-bit registers 74S174). Mux/Register 420 may be five quadruple, 2-input multiplexers (74298) with storage. ALU 430 may be four 4-bit flowthrough arithmetic logic units (74S181). Sign gate 436 may be an exclusive OR gate (74S86). Gate 484 may be a three-input NOR gate (7427) with output inverted by a three-input NOR gate (7427) having two unused inputs grounded. Enable flip-flop 486 may be a JK flip-flop (74S112) with presetting and resetting gating circuitry responsive to control logic 70. One detector 488 may be two 5-input NOR gates (74S260) and one 2-input AND gate (74S08) having a high level output in the absence of ones. Register 474 and 490 may each be 28 6-bit registers (74174) operated in 12 pairs. Decoder 476 may be a 4-to-16 decoder (74154) with two surplus outputs. Gate 492 may be an AND gate (74S08).

The field of view cross-section is determined by the shape of each simulated window and may be controlled in many ways, i.e. software clipping by GP computer 40, logic clipping by image processor 42, electronic clipping by analog circuits in image generator 44, or optically clipped in CRT device 82. Alternatively, the dimensions of the effective display may depend on more than one form of clipping. In the present case a square pyramid of vision is established clipping circuit 480; however, a cone of vision may be established by providing a round CRT.

SECTION XI

Input Control Logic 66

Figure 5:
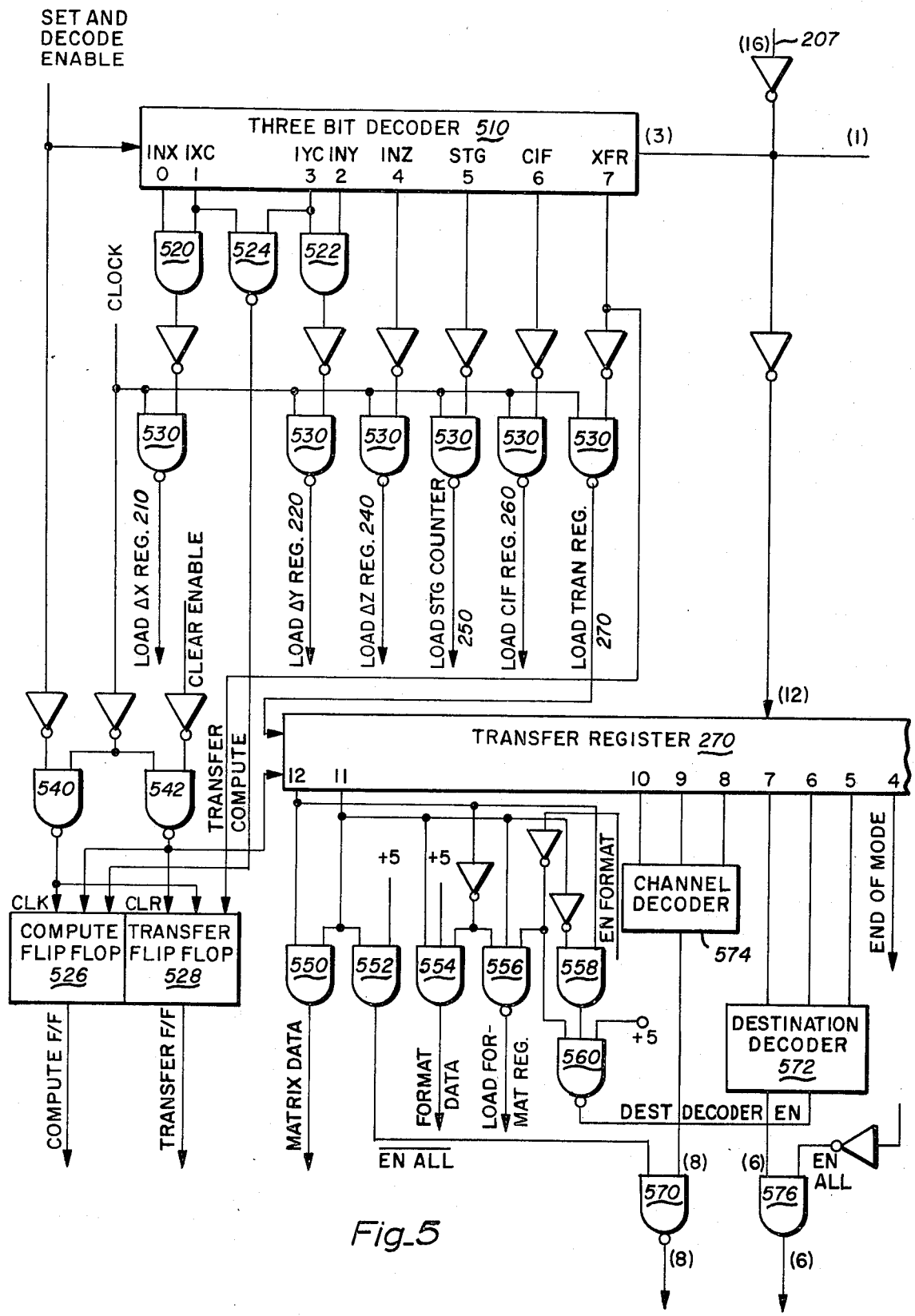
FIG. 5 is a logic circuit of the input logic control which activates the translation stage.

FIG. 5 shows the detailed logic circuitry for input control logic 66. Image data bus 207 supplies a three bit decoder 510 with the three MSB of codes 15, 14, and 13 which are decoded into the eight code outputs for loading the six input registers of translation stage 60. The codes are described in more detail in Section VI, Data Format. Output zero INX(000) and output one IXC(001) are ORed through NAND gate 520 for loading X coordinate data into delta X input register 210. Output two INY(010) and output three IYC(011) are ORed through AND gate 522 for loading Y coordinate data into delta Y input register 220. Output one IXC and output three IYC are ORed through NAND gate 524 to set a compute flip flop 526 into the compute mode. Compute flip flop 526 outputs to translation control logic 68 to initiate a compute operation. Output four INZ(100) loads Z coordinate data into delta Z input register 240. Output five STG(101) loads string length data into string counter 250. Output six CIF(110) loads color-intensity-flag data into CIF input register 260. Output seven XFR(111) loads additional code data into transfer register 270 and sets XFR flip flop 528 into the XFR mode. Flip flop 528 outputs to translation control logic 68 to indicate additional decoding is required. Sync gates 530 are preferably provided for syncing the loading pulses to translation stage 60. A Set and Decode Enable signal from translation control logic 68 clocks flip flop 526 and 528 through a NAND gate 540 and strobes three bit decoder 510 to initiate operation of input control logic 66 after each operation of translation control logic 68. A Clear Enable signal from translation control logic 68 clears flip flops 528 and 528 through a NAND gate 542 at the end of each operation. Flip flops 527 and 528 are synced by clock pulses through gates 540 and 542.

Input control logic 66 additionally decodes bits 12-4 from transfer register 270. Initialization bit 12 and channel bit 11 output into a gate network to provide:

Matrix Data signal to translation control logic 68 through AND gate 550 when bit 12 and bit 11 are true.

Enable All (−) signal to channel gates 570 through AND gate 552 when channel bit 11 is false.

Format Data signal to translation control logic 68 through AND gate 554 when bit 12 is false and bit 11 is true.

Load Format Register signal to projection stage 64 through AND gate 556 when bit 12 is false, bit 11 is true, and an Enable Format signal from translation control logic 68 is false.

Destination Enable signal to destination decoder 572 through AND gate 558 and NAND gate 560 when bit 12 is true, bit 11 is false, and the Enable Format signal is false.

Channel data bits 10, 9, and 8 from transfer register 270 are additionally decoded into one of eight window perspectives or channels by a channel decoder 574. Decoder 574 outputs into eight channel gate 570 which are ORed with Enable All from gate 552. When Enable All is true, a single gate 570 is enabled by channel data to process rotation matrix data unique to that channel. When Enable All is false all gates 570 are enabled to process image data required by all channels. Channel data bits 7, 6, and 5 from transfer register 270 are additionally decoded by destination decoder 572 to one of six destination gates 576 during initialization operation for providing load signals to the appropriate translation accumulator 214, 224, or 244. An Enable All signal from translation control logic 68 enables all translation accumulators to load simultaneously during delta data or light point operation.

Decoders 510, 572, and 574 may be three-dual, two-line to four-line decoder (74155) connected to a three-line to eight-line configuration. AND gates 520, 522, 550, 552, 558, and 576 may be two input AND gates (74S08). NAND gates 524, 530, 540, 542, and 570 may be two input NAND gates (74S00). NAND gates 556 and 560 may be three input NAND gates (74S10). AND gate 554 may be a three input AND gate (74S11). Flip flops 526 and 528 may be one-half of a four bit register (74S175).

SECTION XII

Input/Translation Control Logic 68

The following flow chart description discloses the operation of input/translation control logic 68. The operation includes STEPS 0–34 which are clocked in the order listed, and DECISIONS A-O. Control logic has three internal phases of operation (I, II, III) which occur as indicated. Numerous hardware circuits could be designed to perform these sequences generating the desired control signals to translation stage 60 and control logic 70.

| LOADING TRANSLATION STAGE 60 INPUT REGISTER | | | |
|---|---|---|---|
| STEP 0 | (a) Initial state of input/translation control logic 68. | | |
|  | (b) Begin Phase 1 (XYZ counter 00). | | |
| STEP 1 | SET AND DECODE ENABLE signal enables 3 bit decoder 510, flip flop 526, and flip flop 528 to be set by 3 bit data code, permitting light point data to load into one of registers 210, 220, 240, 250, 260 or 270 of translation stage 60 if IP DAV true form IP DAV flip flop 205. | | |
| DECISION A | Is IP DATA AVAILABLE true? | YES<br>NO | STEP 2<br>STEP 1 |
| STEP 2 | IP DATA REQ signal from control logic 68 resets flip flop 205. | | |
| DECISION B | Is COMPUTE flip flop 526 set? | YES | DECISION M |
|  |  | NO | DECISION C |
| DECISION C | Is TRANSFER flip flop 528 set? | YES | DECISION D |
|  |  | NO | STEP 1 |
| DECISION D | Is destination of data either RAM 340 (matrix data) or format register 474 (texture data)? | YES<br>NO | STEP 9<br>DECISION E |

-continued

| DECISION E | Is END OF MODE signal in transfer register 270 true? | YES NO | DECISION J STEP 3 |

INITIALIZATION OF MUX/REG 211, 221 OR 241

| STEP 3 | No operation - waiting for DECISION F to be YES. | | |
| DECISION F | Is IP DATA AVAILABLE true? | YES NO | STEP 4 STEP 3 |
| STEP 4 | EN FORMAT signal (inputs to gates 556 and 560) causes initialization data to load into 211, 221 or 241. | | |
| STEP 5 | (a) IP DATA REQ signal resets flip flop 205. (b) CLEAR ENABLE signal from control logic 68 clears flip flops 526 and 528 and transfer register 270. (c) Return to STEP 1. | | |

INITIALIZATION OF RAM 340 OR FORMAT REGISTER 474

| STEP 9 | (a) Clear RAM/format address counter in control logic 70. (b) Set ENABLE flip flop 486. | | |
| STEP 10 | No operation - waiting for DECISION G to be YES. | | |
| DECISION G | Is IP DATA AVAILABLE true? | YES NO | STEP 11 STEP 10 |
| STEP 11 | (a) Enable RAM 340 to write if MATRIX DATA signal from gate 550 true. (b) EN FORMAT signal enables gate 556 making load format register signal true for enabling decoder 476. | | |
| STEP 35 | No operation - provide settling period before STEP 12. | | |
| STEP 12 | (a) IP DATA REQ signal clears flip flop 205. (b) Advance RAM/format address counter (of STEP 9a). | | |
| DECISION H | Is RAM/format address counter equal to 8 and MATRIX DATA signal from gate 550 true? | YES NO | STEP 1 DECISION I |
| DECISION I | Is RAM/format address counter equal to 15? | YES NO | STEP 6 STEP 10 |
| STEP 6 | No operation - waiting for DECISION J to be NO. | | |
| DECISION J | Is DISPLAY BUSY signal from busy logic 688 true? | YES NO | STEP 6 STEP 7 |
| STEP 7 | (a) Load new point register 490. (b) Same as STEP 5b. (c) Return to STEP 1. | | |

END OF MODE

| STEP 13 | No operation - waiting for DECISION J to be YES. | | |
| DECISION J | Is MULTIPLICATION/DIVISION DONE signal from control logic 70 true? | YES NO | STEP 14 STEP 13 |
| STEP 14 | (a) Begin Phase II (XYZ counter 01). (b) Same as STEP 5b. (c) Provide MULTIPLICATION START signal to control logic 70. (d) Provide DIVISION START signal to control logic 70. | | |
| STEP 15 | No operation - waiting for DECISION K to be YES. | | |
| DECISION K | Same as DECISION J | YES NO | STEP 16 STEP 15 |
| STEP 16 | Begin Phase III (XYZ counter 10). Provide DIVISION START signal to control logic 70. | | |
| STEP 17 | No operation - waiting for DECISION L to be YES. | | |
| DECISION L | Same as DECISION J | YES NO | STEP 18 STEP 17 |
| STEP 18 | (a) Set startup flip flop in control logic 68. (b) Return to Phase I. (c) Return to STEP 1. | | |

LIGHT DATA PROCESSING

| STEP 19 | Enable loading of buffer registers 218, 228 or 248 if START flip flop (STEP 18a) is set and if Phase II is true. | | |
| DECISION M | Same as DECISION J | YES NO | STEP 20 STEP 19 |
| STEP 20 | (a) Provide MULTIPLICATION START signal except when STARTUP flip flop is set and Phase I is true. (b) Provide DIVISION START signal except when STARTUP flip flop is set and Phase I true or Phase II true. (c) Begin next phase. (d) Clear RAM/format address counter (STEP 9a). (e) Clear STARTUP flip flop (STEP 18a) if Phase III true (prior to STEP 20c). (f) Load CIF register 460 if Phase III true (prior to STEP 20c). | | |
| DECISION N | Is Phase I true (prior to STEP 20c)? | YES NO | STEP 21 DECISION Q |
| DECISION O | Are COMPUTE signal from gate 254 not true and Phase III true (prior to STEP 20c)? | YES NO | STEP 21 STEP 19 |
| STEP 21 | (a) ENABLE ALL signal from control logic 68 enables gates 576 to enable loads to MUX/registers 211, 221 and 241 from adders 213, 223 and 243. (b) Same as STEP 5b. (c) Enable string counter 250 to count down one light. | | |

-continued

| | |
|---|---|
| STEP 22 | Enable normalize registers 216, 226 and 246 to load data from MUX/registers 211, 221 and 241. |
| STEPS 23–33 | Allow normalize registers 216, 226 and 246 to left shift until NORMALIZATION COMPLETE signal. |
| STEP 34 | (a) Same as STEP 23. <br> (b) Return to STEP 19. |

SECTION XIII

Rotation and Projection Control Logic 70

The following flow chart description discloses the operation of rotation-projection control logic 70 similar in approach to Section XII.

ROTATION CONTROL SEQUENCE

| | | | |
|---|---|---|---|
| STEP 0 | (a) Clear product register 360. | | |
| | (b) Clear accumulation register 380. | | |
| DECISION A | Is MULTIPLICATION START from control logic 68 true? | YES <br> NO | STEP 2 <br> STEP 1 |
| STEP 1 | Provide MULTIPLICATION DONE signal to control logic 68. | | |
| DECISION B | Same as DECISION A | YES <br> NO | STEP 2 <br> STEP 1 |
| STEP 2 | (a) Same as STEP 0a. | | |
| | (b) Select BYTE 0 from MUX 310. | | |
| | (c) Load multiplier register 320. | | |
| | (d) Load multiplicand register 350. | | |
| | (e) Provide OUTPUT ENABLE to X buffer register 218. | | |
| STEP 3 | (a) Load product register 360. | | |
| | (b) Select BYTE 1 from MUX 310. | | |
| | (c) STEP 2c. | | |
| | (d) STEP 2e. | | |
| STEP 4 | (a) STEP 3a. | | |
| | (b) STEP 0b. | | |
| | (c) Select BYTE 2 from MUX 310. | | |
| | (d) STEP 2c. | | |
| | (e) STEP 2e. | | |
| STEP 5 | (a) STEP 3a. | | |
| | (b) Select BYTE 3 from MUX 310. | | |
| | (c) STEP 2c. | | |
| | (d) Advance RAM/format counter of STEP 9a (Section XII). | | |
| | (e) STEP 2e. | | |
| STEP 6 | STEP 3a. | | |
| STEP 7 | Load accumulator register 380. | | |
| STEP 8 | (a) STEPS 2a–d. | | |
| | (b) Provide OUTPUT ENABLE signal to Y buffer register 228. | | |
| STEP 9 | (a) STEPS 3a–c. | | |
| | (b) STEP 8b. | | |
| STEP 10 | (a) STEP 3a. | | |
| | (b) STEP 4c. | | |
| | (c) STEP 2c. | | |
| | (d) STEP 8b. | | |
| STEP 11 | (a) STEP 3a. | | |
| | (b) STEP 5b. | | |
| | (c) STEP 2c. | | |
| | (d) STEP 5d. | | |
| | (e) STEP 8b. | | |
| STEP 12 | STEP 3a. | | |
| STEP 13 | STEP 7. | | |
| STEP 14 | (a) STEPS 2a–d. | | |
| | (b) Provide OUTPUT ENABLE signal to Z buffer register 248. | | |
| STEP 15 | (a) STEPS 3a–c. | | |
| | (b) STEP 14b. | | |
| STEP 16 | (a) STEP 3a. | | |
| | (b) STEP 4c. | | |
| | (c) STEP 2c. | | |
| | (d) STEP 14b. | | |
| STEP 17 | (a) STEPS 5a–d. | | |
| | (b) STEP 14b. | | |
| STEP 18 | (a) STEP 3a. | | |
| | (b) STEP 1. | | |
| STEP 19 | (a) STEP 7. | | |
| | (b) STEP 1. | | |
| | (c) Load buffer registers 218, 228 and 248 if Phase II true. | | |
| | (d) Return to DECISION A. | | |

PROJECTION CONTROL SEQUENCE

| | | | |
|---|---|---|---|
| STEP 0 | No operation - waiting for DECISION A to be YES. | | |
| DECISION A | Is DIVISION START signal from control logic 68 true? | YES <br> NO | STEP 2 <br> STEP 1 |
| STEP 1 | (a) Provide DIVISION DONE signal to control logic 68. | | |
| | (b) Select texture data bus 208 through output MUX 470. | | |
| DECISION | Same as DECISION A | YES | STEP 2 |

-continued

| B | | | NO | STEP 1 |
|---|---|---|---|---|
| STEP 2 | (a) | Select Xc,Yc into MUX register 420. | | |
| | (b) | Load MUX register 420. | | |
| | (c) | Select CIF register 460 through output MUX 470. | | |
| | (d) | Provide CIF format address to decoder 476. | | |
| | (e) | Load Z/2 register 410 if Phase I true. | | |
| | (f) | Provide load format register signal to decoder 476 if Phase I true. | | |
| | (g) | Load clipping result into ENABLE flip flop 486 if Phase I true. | | |
| STEP 3 | (a) | Provide DIVIDE signal NOT TRUE to projection stage 64. | | |
| | (b) | Load clipping result into ENABLE flip flop 486 if Phase I not true. | | |
| | (c) | STEP 2c. | | |
| | (d) | STEP 2d. | | |
| | (e) | Enable register 450 to load from register 410 if Phase I true. | | |
| STEP 19 | (a) | Provide output = input function to ALU 430. | | |
| | (b) | STEP 2b. | | |
| | (c) | Select ALU 430 into MUX/register 420. | | |
| | (d) | Allow renormalization register 450 to right shift until renormalization complete if Phase I true. | | |
| STEP 4–14 | (a) | Provide DIVIDE signal TRUE to projection stage 64. | | |
| | (b) | Enable quotient register 440 to shift one quotient bit. | | |
| | (c) | STEP 19c. | | |
| | (d) | STEP 2b. | | |
| | (e) | STEP 19d. | | |
| STEP 15 | (a) | STEP 4a. | | |
| | (b) | STEP 4b. | | |
| | (c) | STEP 4c. | | |
| | (d) | STEP 4d. | | |
| | (e) | Select register 440 through output MUX 470 if Phase I false. | | |
| | (f) | Provide Yd format register address to decoder 476 if Phase III true. | | |
| | (g) | Provide Xd format register address to decoder 476 if Phase II true. | | |
| | (h) | Provide LOAD FORMAT REGISTER signal to decoder 476. | | |
| | (i) | Select register 450 through output MUX 470 if Phase I true. | | |
| | (j) | Provide Zc format register address to decoder 476 if Phase I true. | | |
| STEP 16 | (a) | STEP 15e. | | |
| | (b) | STEP 15f. | | |
| | (c) | STEP 15g. | | |
| | (d) | STEP 15i. | | |
| | (e) | STEP 15j. | | |
| DECISION C | Is Phase III true? | | YES NO | DECISION D DECISION A |
| DECISION D | Is DISPLAY BUSY true? | | YES No | STEP 17 STEP 18 |
| STEP 17 | No operation - waiting for DECISIONS C and D to be YES and NO, respectively. | | | |
| STEP 18 | (a) | Load new point register 490. | | |
| | (b) | STEP 1b. | | |
| | (c) | Return to DECISION A. | | |

SECTION XIV

Deflection Stage 72

Figure 6:
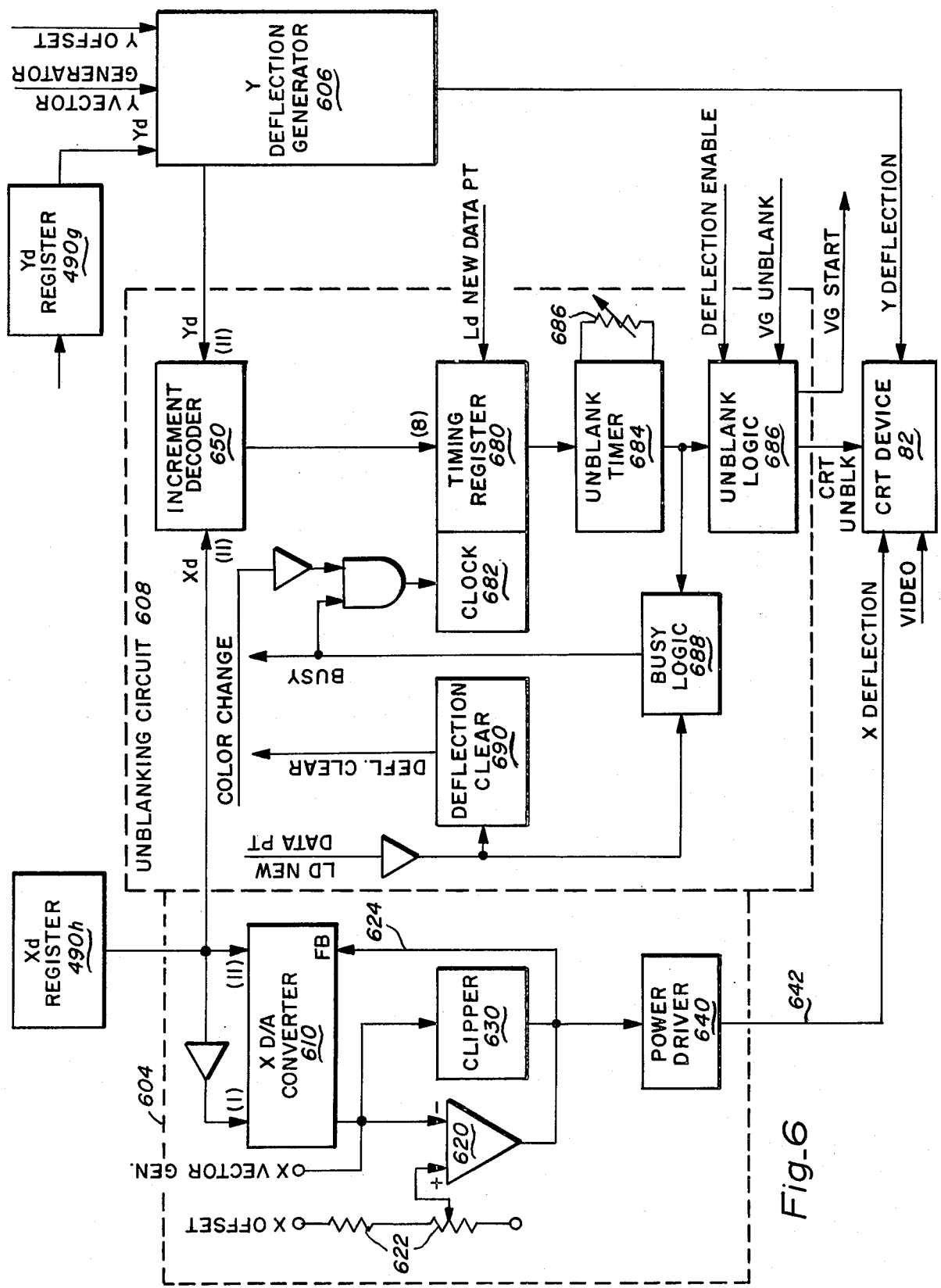
FIG. 6 is a logic circuit of the deflection stage which generates X and Y deflection voltages in response to $Vd$ ($Xd$, $Yd$).

FIG. 6 shows X deflection generator 604, Y deflection generator 606 and CRT unblanking circuit 608 which receive digital deflection data $Xd$ and $Yd$ from projection stage 64 and generate analog X and Y deflection voltages and unblank periods for CRT display devices 82. In deflection generator 604, $Xd$ data from new point register 490h enters X A/D converter 610.

The MSB of $Xd$ is inverted from the 2's complement format of register 474h into the binary format. Operational amplifier 620 receives the analog output of A/D 610 which is summed with X VECTOR GENERATOR signal. Amplifier 620 also receives X OFFSET signal through scaling resistors 622 for positioning the CRT display within the rotated data window of stage. The analog output of amplifier 620 is preferably limited to ± 5 volts by clipping network 630 which defines the X dimension of the CRT display. The ± 5 ma output of amplifier 620 is preferably increased to ± 100 ma by power driver 640. X deflection voltage at output 642 drives the deflection circuits of display device 82. Y deflection generator 606 is identical in structure and operation to X generator 604.

A/D converter 610 may be a 12 bit binary unipolar device (AD562 KD-BIN) from Analog Devices which provides a feedback resistor in feedback line 624. Amplifier 620 may be a feedback operational amplifier (NE531) from Signetics in summing configuration. Resistors 622 are preferably 10,000 ohms each. Clipping network 630 may be two 5.1 volt zenor diodes (1N751A) connected in reverse polarity and in back-to-back configuration with two switching diodes (1N914). Power driver 640 may be a suitable output amplifier capable of driving ± 5 volts at a load current of ± 200 ma at a maximum full output frequency of 3 MHz, such as power driver (model 9824) by Optical Electronics Incorporated.

Unblanking circuit 608 generates CRT UNBLANK to CRT devices 82 causing the electron beam to strike the CRT phosphor simulating a light point in data base 48. A CRT blank period or beam stabilization increment between each point activation is determined for each new light point and is sufficient to permit acceleration, movement and deceleration of the electron beam. First, X$d$ and Y$d$ load into increment decoder 650. Decoder 650 retains the previous data point X$d$ and Y$d$, and by systematic comparison to the new light point X$d$ and Y$d$, identifies which is greater, delta X$d$ or delta Y$d$. Then decoder 650 enters a 1 into timing register 680 along one of eight outputs in accordance with the magnitude of the identified delta. Clock 682 then progressively left shifts the 1 to the MSB activating unblank timer 684. The number of clock pulses required is greater for larger deltas allowing time for the electron beam to move to the new light source position. Unblank timer 684 determines the exposure time during which the electron beam activates the CRT phosphor. Potentiometer 686 is provided for adjusting the unblank period to accommodate the video gain of CRT device 82 and for particular CRT phosphors. A five microsecond unblank period is preferred for the Kratos 25" beam penetration display CM 325S1. Unblank logic 686 combines the output of unblank timer 684 with DEFLECTION ENABLE from control logic 70 to provide CRT UNBLANK to CRT device 82.

Busy logic 688 inhibit data processing through new point register 490 by a BUSY signal to control logic 70 between the loading of each new point into image generator 44 and the termination of the CRT UNBLANK period for that new point. BUSY also inhibits clock 682 during the same period.

Deflection clear circuit 690 limits the time period during which the deflection coils in CRT device 82 will be required to maintain any electron beam position. After expiration of the maximum deflection period, which in the present case is about 8 milliseconds, clear circuit 690 provides DEFLECTION CLEAR to control logic 70. Clear circuit 690 prevents damage to the deflection coils during startup, shutdown, or system malfunction which might otherwise cause maximum deflection current to needlessly flow through the coils beyond the ratings of the coils.

Increment decoder 650 and the operation of BUSY is shown in more detail in Patent Application Ser. No. 642,645 entitled "Real-Time Simulation of a Point System Having Coordinated Data Flow as Viewed by a Moving Observer" and filed on Dec. 19, 1975 by R. G. Nielsen and assigned to the present assignee.

Timing register 680 may be an 8-bit register (74199) with J and K inputs at + 5 volts and clock-inhibit grounded.

Clock 682 may be any oscillator having a three-dimensional period.

Unblank timer 684 may be a oneshot (74121) using the A1 and A2 inputs and an external 20K ohm timing resistor.

Unblank logic 686 may be an AND gate (7410) and a 50 ohm driver (7440) connected in series therewith.

Busy logic 688 may be a flip-flop (7474) set by LD NEW DATA PT and clocked by the inverted output of timer 684, with D input grounded.

SECTION XV

Conclusion

It will be apparent to those skilled in the art that the objects of this invention have been accomplished by a data format organized to minimize the amount of data required to define the scene content and arranged to minimize electron ballastic time requirements. Real-time simulation is enhanced by providing a ¾ inch LSB in the position vector and initialization data. A ¾ inch scene shift is undetectable by the human eye at distances further away than the minimum distance established by clipping circuit 480. A three inch LSB on the delta data is sufficient to simulate real-time resolutions.

The foregoing specification is for illustrative purposes only and various changes can be made therein without departing from the scope of the invention. For example, the display device is not limited to the conventional two-dimensional CRT. Three-dimensional visual means may be employed. Depth data along the Z axis is available at the input to projection stage 64 and may be used in the appropriate device for depth effects. The object data base is not limited to digital input of a fixed portion of the earth's surface containing an airport as described. The object data may include several airports for simulating commuter flights, a moving aircraft carrier, a target or reconnaisance area, or even another aircraft for simulating air-to-air refueling and combat. The data points processed to the display device may represent the vertices of closed polygon faces to be textured by texture stage 76.

We claim as our invention:

1. A data processor responsive to observer position and orientation data from a simulation computer, and to object point data to simulate the visual relationship between an observer coordinate system and an object coordinate system in relative motion;
   object data source means for providing object point digital data;
   computer means for receiving object point data and adapted to receive at least the observer position data from the simulation computer and responsive to the received data for providing initialization data by translating selected initial object points from the object data source into the observer coordinate system, and for holding at least the object point data and the initialization data in a predetermined image digital data format having dedicated code bits for identifying classes of data; and
   a hard-wired image digital circuit responsive to the code bits of the image data format to receive the object point data and the initialization data for translating the object point data into the observer coordinate system, and responsive to the observer orientation data for rotating the object point data into the observer coordinate system, and which is adapted to forward the translated and rotated object point data to a display device for providing a visual scene of at least a portion of the object point data in the observer perspective.

2. The data processor of claim 1, wherein:
   the observer position data is a position vector;
   the initialization data are initialization vectors formed by adding the position vector to the object coordinate system position of each of the selected initial points; and
   the hard-wired image circuit has a translation stage in which an initialization vectors is added to the object coordinate system position of each of the object points to translate each object point into the observer coordinate system.

3. The data processor of claim 2 wherein each initial object point is associated with a set of object points which sequentially follow the initialization point in the image data format without intervening positional data.

4. The data processor of claim 3, wherein the image data is processed by the hard-wired image circuit sequentially in the formatted order.

5. The data processor of claim 4, wherein:
P bits are allowed for the position vector;
I bits are allowed for the initialization vector;
D bits are allowed for the object points; and
the positional difference between sequential object points in the image data format can be expressed in D bits.

6. The data processor of claim 5, wherein P and I are greater than D.

7. The data processor of claim 6, wherein:
the position vector and orientation data periodically received by the computer means is update data corresponding to the simulated movement of the observer coordinate system since the previous update data;
the period between update data is sufficiently short to simulate real-time motion to the observer; and
the LSB of the position vector represents a distance sufficiently small so as to exhibit negligible vector position roundoff error in the observer's perspective.

8. The data processor of claim 7, wherein the distance represented by the LSB of the I position vector bits is less than the distance represented by the LSB of the D object data bits.

9. The data processor of claim 8, wherein:
the image data format is 16 bits wide, three code bits plus 13 D bits;
the LSB of D corresponds to 6 inches in the data source; and
the LSB of I and P correspond to ¾ of an inch in the data source.

10. The data processor of claim 4, wherein the hard-wired image circuit includes:
a translation stage for translating the position of the object points into the observer coordinate system;
a rotation stage for rotating the object coordinate system into the observer orientation; and
a projection stage for projecting the object data into a display plane.

11. The data processor of claim 10, wherein:
each object point of the object data source is held in the image data format and processed through the image circuit each frame.

12. The data processor of claim 11, wherein:
the origin of observer coordinate system is proximate the eye of the observer and one of its axes is in the direction of motion; and
clipping of object points behind the observer is effected through the axis of motion sign bit of each object point.

13. The data processor of claim 12 wherein object points a short distance in front of the origin of the observer coordinate system are clipped by all zeros in the most significant portion of the axis of motion data.

14. The data processor of claim 11, wherein a field of view is established by the image circuit for clipping the object points not visible to the observer.

15. The data processor of claim 14, wherein the field of view is a pyramid of vision.

16. The data processor of claim 15, wherein the pyramid of vision has four equal apex angles.

17. The data processor of claim 16, wherein the apex angle has an arc cotangent of two.

18. The data processor of claim 11, wherein the object points are stationary within the object coordinate system.

19. A real-time system for simulating a point structure as viewed by a movable observer within a gaming area, comprising:
object data source for providing object point data including a plurality of sets of points each including an initial point for positionally defining the remaining points in each set;
observer data source for providing real-time observer orientation data and real-time position vectors extending from a first reference point in the observer coordinate system to a second reference point in the object coordinate system;
computer means responsive to the position vectors for translating the initial point associated with each set of points from object coordinates into observer coordinates forming a plurality of initialization vectors, and for entering the initialization vectors and the orientation data and the object data into storage according to a predetermined format;
image processor responsive to the formatted data for adjusting the perspective of the object data to conform to the orientation of the observer;
image generator responsive to perspective adjusted data for providing deflection voltage; and
display means responsive to the deflection voltages for providing a scene of the object data source in the perspective of the observer.

20. The system of claim 19, wherein the image processor has a translation stage for translating the object data from object coordinates into observer coordinates by combining the object point coordinates of each point to the initialization vector of the initial point from the same set as each object point.

21. The system of claim 20, wherein at least a portion of the initial points are also points of the object structure.

22. The system of claim 21, wherein the object point data of all of the object points within a set sequentially input to the translation stage starting with the initialization vector of the initialization point.

23. The system of claim 22, wherein the object point data within each set sequentially inputs to the translator stage by subsets, each subset having at least one common characteristic.

24. The system of claim 22, wherein object point data concerning points of the same color are grouped in the same subset.

25. The system of claim 22, wherein object point data concerning points of the same size are grouped within the same subset.

26. The system of claim 20, wherein the computer means selectively enters the data into a buffer storage means to establish the predetermined format.

27. The system of claim 26, wherein the buffer storage means is an in-core memory buffer.

28. The system of claim 26, wherein the buffer storage means is an in-core memory buffer for initially holding the data, and a hardware random access memory which subsequently holds the data.

29. The system of claim 26, wherein the formatted data passing from the computer means to the translation stage is bit-encoded according to data type.

30. The system of claim 29, wherein the translation stage has a plurality of input means responsive to the code bits for selectively receiving the corresponding data.

31. The system of claim 20, wherein the image processor additionally has a rotation stage which rotates the object data in response to the observer orientation data to conform to the orientation of the observer.

32. The system of claim 31 wherein:
the observer orientation has three degrees of freedom;
the observer orientation data is a three by three rotational matrix; and
each point of the object data is multiplied by the rotational matrix.

33. The system of claim 32, wherein:
the observer position has three degrees of freedom; and
the image processor has a projection stage for projecting the three position coordinates into two coplanar display coordinates.

34. The system of claim 33, wherein the display means is a CRT device with X and Y deflection circuits responsive to the deflection voltages for generating points of excitation on the CRT phosphor screen.

35. The system of claim 34, wherein the CRT device is a random deflection type.

36. The system of claim 31, wherein the first reference point in the observer coordinate system is the origin of the observer system and is proximate the apex of the simulated field of vision.

37. The system of claim 36, wherein the second reference point in the object coordinate system is the origin of the object coordinate system.

* * * * *

UNITED STATES PATENT AND TRADEMARK OFFICE
CERTIFICATE OF CORRECTION

PATENT NO. : 3,996,672
DATED : December 14, 1976
INVENTOR(S) : Raymond C. Osofsky et al It is certified that error appears in the above-identified patent and that said Letters Patent are hereby corrected as shown below:

Page 1, right hand column, line 4, "respct" should be -- respect --.

Col. 6, lines 11 and 12 are repeated as lines 13 and 14.

Col. 7, lines 61-67 should be rewritten because letters of first words in left hand margin weren't printed. Rewrite as follows:

> Figs. 2 through 6. Preferred embodiments are disclosed at the detailed logic level. Each component is described by function, input-output characters, or conventional nomenclature to enable one skilled in the arts of simulation, digital design, and computer programming to practice the invention. The components are additionally designated by the manufacturer's IC type Col. 14, line 2, "AND" should be --NAND--.

Col. 14, line 27, "to" should be -- in --.

Signed and Sealed this

Twenty-third Day of May 1978

[SEAL]

Attest:

RUTH C. MASON
*Attesting Officer*

LUTRELLE F. PARKER
*Acting Commissioner of Patents and Trademarks*